US009432129B2

(12) United States Patent
Gosling

(10) Patent No.: US 9,432,129 B2
(45) Date of Patent: Aug. 30, 2016

(54) COMMUNICATION WITH AN UNDERWATER VEHICLE

(71) Applicant: GO SCIENCE GROUP LTD, Virgin Islands (GB)

(72) Inventor: Harry George Dennis Gosling, Bristol (GB)

(73) Assignee: GO SCIENCE GROUP LTD, Tortola (VG)

( * ) Notice: Subject to any disclaimer, the term of this patent is extended or adjusted under 35 U.S.C. 154(b) by 44 days.

(21) Appl. No.: 14/380,824

(22) PCT Filed: Feb. 28, 2013

(86) PCT No.: PCT/GB2013/050492
§ 371 (c)(1),
(2) Date: Aug. 25, 2014

(87) PCT Pub. No.: WO2013/128188
PCT Pub. Date: Sep. 6, 2013

(65) Prior Publication Data
US 2015/0019053 A1    Jan. 15, 2015

(30) Foreign Application Priority Data

Mar. 2, 2012    (GB) .................................. 1203671.1

(51) Int. Cl.
*H04B 11/00*        (2006.01)
*G01S 19/14*        (2010.01)
(Continued)

(52) U.S. Cl.
CPC .................. *H04B 11/00* (2013.01); *B63G 8/08* (2013.01); *G01S 5/0009* (2013.01); *G01S 5/30* (2013.01); *G01S 19/14* (2013.01); *H04B 13/02* (2013.01); *B63G 8/001* (2013.01); *H04L 25/4902* (2013.01)

(58) Field of Classification Search
CPC ....... H04B 11/00; H04B 13/02; B63G 8/001
See application file for complete search history.

(56) References Cited

U.S. PATENT DOCUMENTS 3,885,515 A     5/1975  Caldwell, Jr. et al.
4,203,160 A *   5/1980  Doherty ................. H04B 11/00
                                                   128/201.19
(Continued)

FOREIGN PATENT DOCUMENTS

GB          1437806      6/1976
GB          2408576      6/2005
WO          93/15567     8/1993

OTHER PUBLICATIONS

Search Report & Written Opinion issued in Int'l App. No. PCT/GB2013/050492 (2013).

*Primary Examiner* — Khoi Tran
*Assistant Examiner* — Ryan Rink
(74) *Attorney, Agent, or Firm* — Barnes & Thornburg LLP; Mark J. Nahnsen

(57) ABSTRACT

A method of communicating with an underwater vehicle comprising a propulsion system for propelling the vehicle through the water. A series of data sets are encoded and transmitted to the underwater vehicle in a series of signal bursts, and decoded at the underwater vehicle. The propulsion system is operated in a series of thrust pulses separated by drift periods such that the propulsion system operates at a relatively high rate during the thrust pulses and at a relatively low (or zero) rate during the drift periods. The drift periods are timed such that each signal burst arrives at the underwater vehicle during a drift period and not during a thrust pulse. The method may be performed with a single vehicle or a plurality of underwater vehicles. The encoded data signals are broadcast simultaneously to the underwater vehicles in the series of signal bursts.

18 Claims, 14 Drawing Sheets

(51) Int. Cl.
*G01S 5/00* (2006.01)
*G01S 5/30* (2006.01)
*H04B 13/02* (2006.01)
*B63G 8/08* (2006.01)
*B63G 8/00* (2006.01)
*H04L 25/49* (2006.01)

(56) References Cited

U.S. PATENT DOCUMENTS

| | | |
|---|---|---|
| 5,119,341 A | 6/1992 | Youngberg |
| 5,784,339 A | 7/1998 | Woodsum et al. |
| 5,894,450 A * | 4/1999 | Schmidt ............... H04B 13/02 367/131 |
| 2008/0090518 A1 | 4/2008 | Yoshida et al. |
| 2009/0196122 A1* | 8/2009 | Crowell ............... H04B 11/00 367/127 |
| 2012/0137949 A1* | 6/2012 | Vosburgh ............. B63G 8/001 114/330 |
| 2015/0003192 A1* | 1/2015 | Imran .................... F03B 13/20 367/3 |

* cited by examiner

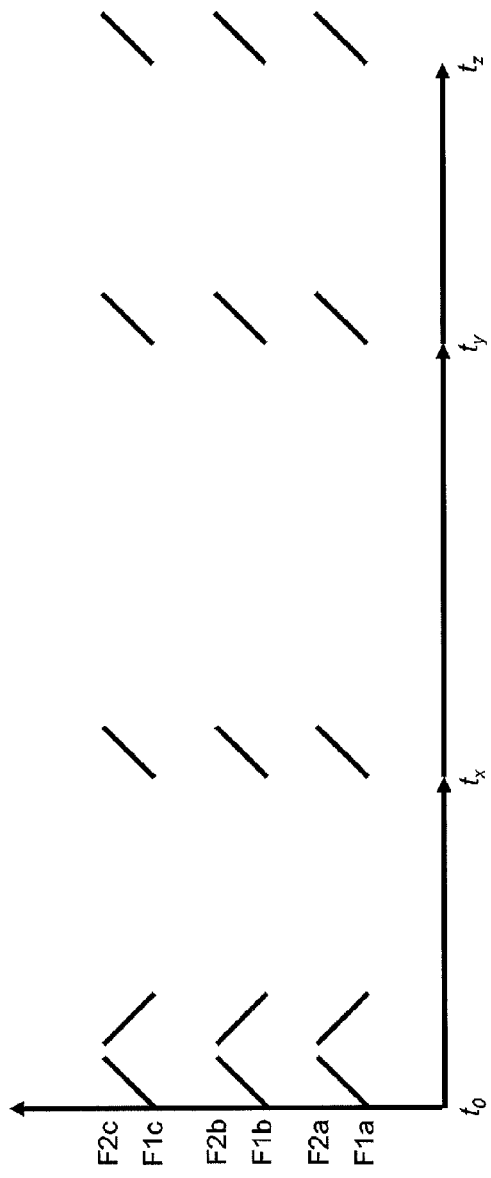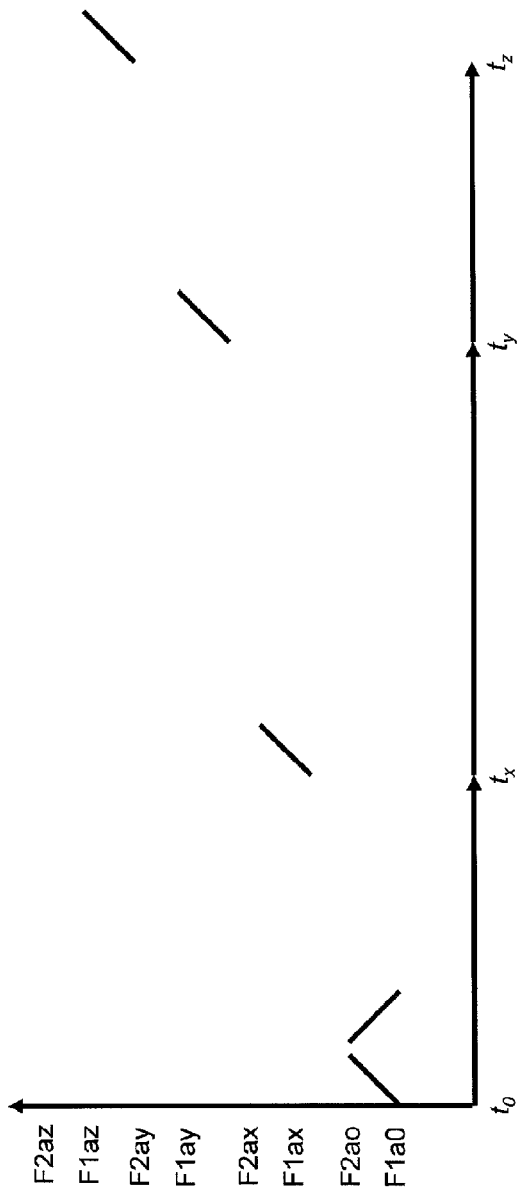

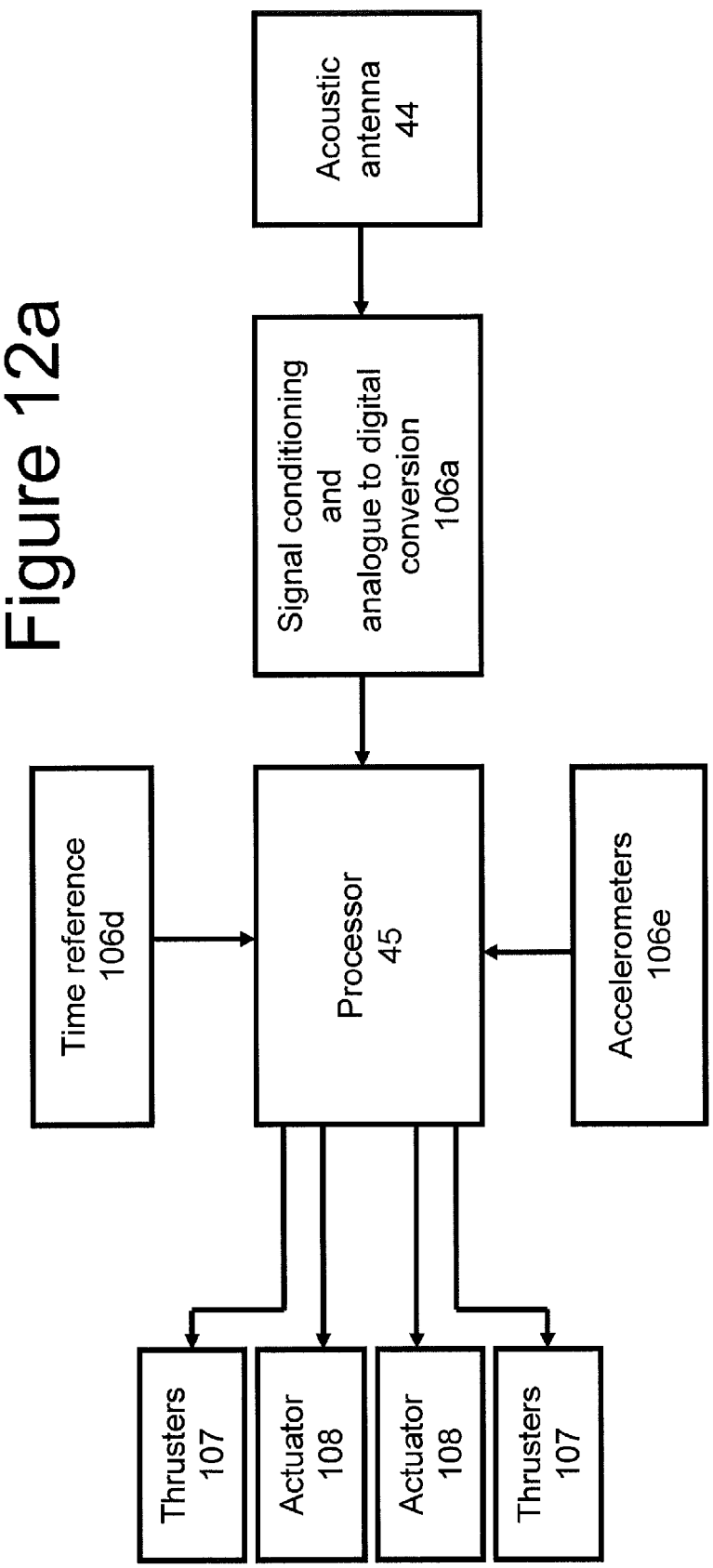

COMMUNICATION WITH AN UNDERWATER VEHICLE

CROSS REFERENCE TO RELATED APPLICATIONS

This application is a U.S. nationalization under 35 U.S.C. §371 of International Application No. PCT/GB2013/050492, filed Feb. 28, 2013, which claims priority to United Kingdom Patent Application No. 1203671.1, filed Mar. 2, 2012. The disclosures set forth in the referenced applications are incorporated herein by reference in their entireties.

FIELD OF THE INVENTION

The present invention relates to a method of communicating with one or more underwater vehicles, a method of operating one or more underwater vehicles, and apparatus for performing such methods.

BACKGROUND OF THE INVENTION

A known method and apparatus for communicating with an underwater vehicle is described in U.S. Pat. No. 5,119,341. A plurality of buoys determine their positions based on Global Positioning System (GPS) navigation satellites and emit acoustic underwater data messages which contains this position. An underwater vehicle receives the messages and determines its position therefrom. Spread spectrum encoding is used to allow a single beacon carrier frequency for all buoys. Alternatively separate and locally-unique beacon carrier frequencies can be assigned to each buoy.

SUMMARY OF THE INVENTION

A first aspect of the invention provides a method of communicating with an underwater vehicle, the underwater vehicle comprising a propulsion system for propelling the vehicle through the water, the method comprising:
a. encoding a series of data sets to produce a series of encoded data signals;
b. transmitting the encoded data signals to the underwater vehicle in a series of signal bursts;
c. operating the propulsion system in a series of thrust pulses separated by drift periods such that the propulsion system operates at a relatively high rate during the thrust pulses and at a relatively low (or zero) rate during the drift periods;
d. timing the drift periods of the propulsion system such that each signal burst arrives at the underwater vehicle during a drift period and not during a thrust pulse; and
e. decoding the signal bursts at the underwater vehicle to obtain the series of data sets.

A further aspect of the invention provides an underwater communication system comprising: a transmitter programmed to perform steps a) and b) above; and one or more underwater vehicles each comprising a propulsion system for propelling the vehicle through the water, and a control and processing system programmed to perform steps c), d) and e) above.

The method may be performed with a single vehicle, or more preferably with a plurality of underwater vehicles wherein the encoded data signals are broadcast simultaneously to the underwater vehicles, typically from a single common transmitter, in the series of signal bursts.

Data may be transmitted to the vehicle(s) by a single transmitter only. However, more preferably the encoded data signals are transmitted to the underwater vehicle in a series of signal bursts by a first transmitter at a first location, and the method further comprises:
a. encoding a second series of data sets to produce a second series of encoded data signals;
b. transmitting the second series of encoded data signals to the underwater vehicle in a second series of signal bursts by a second transmitter at a second location which is remote from the first location;
c. timing the drift periods of the propulsion system such that each signal burst in the second series arrives at the underwater vehicle during a drift period and not during a thrust pulse; and
d. decoding the second series of signal bursts at the underwater vehicle to obtain the second series of data sets.

Typically the first and second series of signal bursts start at substantially the same time.

Preferably the vehicle comprises an annular hull with a duct, wherein water flows through the duct and generates lift during the thrust pulses and during the drift periods.

A further aspect of the invention provides a method of operating an underwater vehicle, the underwater vehicle comprising an annular hull with a duct; and a propulsion system for propelling the vehicle through the water, the method comprising:
a. operating the propulsion system in a series of thrust pulses separated by drift periods such that the propulsion system operates at a relatively high rate during the thrust pulses and at a relatively low (or zero) rate during the drift periods, wherein water flows through the duct and generates lift during the thrust pulses and during the drift periods;
b. receiving a series of signal bursts at the vehicle;
c. timing the drift periods of the propulsion system such that each signal burst arrives at the underwater vehicle during a drift period and not during a thrust pulse; and
d. decoding the signal bursts received at the underwater vehicle to obtain a series of data sets encoded within them.

This method may be performed by a single annular vehicle or by a plurality of underwater vehicles.

A further aspect of the invention provides an underwater vehicle comprising an annular hull with a duct; a propulsion system for propelling the vehicle through the water; and a control and processing system programmed to perform the method described in the further aspect of the invention described above. Typically the annular hull comprises an outer skin defining an outer profile of the hull and an inner skin defining the duct. The inner and outer skins typically meet at a leading edge of the hull and at a trailing edge of the hull.

Typically the control and processing system is housed at least partially within the hull between the inner and outer skins.

Typically the vehicle further comprises an antenna for receiving the signal pulses, wherein the antenna is flush with the inner and outer skins, or housed between the inner and outer skins.

Typically the control and processing system comprises a clock which can be set to provide a clock signal which enables the control and processing system to time the drift periods such that each signal burst arrives at the underwater vehicle during a drift period and not during a thrust pulse.

A further aspect of the invention provides a method of operating a plurality of underwater vehicles to receive a series of data sets which have been broadcast to them, each underwater vehicle comprising a propulsion system for propelling the vehicle through the water, the method comprising for each vehicle:

a. operating the propulsion system in a series of thrust pulses separated by drift periods such that the propulsion system operates at a relatively high rate during the thrust pulses and at a relatively low (or zero) rate during the drift periods;
b. receiving a series of signal bursts at the vehicle;
c. timing the drift periods of the propulsion system such that each signal burst arrives at the underwater vehicle during a drift period and not during a thrust pulse; and
d. decoding the signal bursts received at the underwater vehicle to obtain the series of data sets encoded within them.

A further aspect of the invention provides a plurality of underwater vehicles, each comprising a propulsion system for propelling the vehicle through the water, and a control and processing system programmed to operate the vehicle by the method described in the preceding paragraph.

The following comments apply to all aspects of the invention.

The signal bursts may comprise acoustic signal bursts, or they may comprise electromagnetic signal bursts. Typically the (or each) vehicle comprises a receiver such as an acoustic or electromagnetic antenna for receiving the signal pulses.

Where multiple vehicles are provided then the propulsion systems of the vehicles may be operated substantially synchronously such that the drift periods of all of the vehicles start and finish at substantially the same time. Alternatively the propulsion systems may be operated asynchronously such that the drift periods of at least a first one of the vehicles start and/or finish at different times to at least a second one of the vehicles.

The drift periods may be fixed at the beginning of a mission and remain constant for that mission. Alternatively the method may further comprise measuring a parameter for the (or each) vehicle; and varying the timing of the drift periods accordingly.

The timing of the drift periods may be varied asynchronously such that the drift periods of at least a first one of the vehicles are varied differently to the drift periods of at least a second one of the vehicles.

In one embodiment the method further comprises estimating a time of arrival of the signal bursts at the (or each) vehicle; and varying the timing of the drift periods accordingly, wherein a delay in the estimated time of arrival causes a delay in a start and/or finish time of the drift periods. For instance the time of arrival may be estimated by measuring the time of arrival of a pulse train in a previous cycle relative to a known transmission time for that pulse train.

In one embodiment the method further comprises measuring a proximity of the (or each) vehicle to other vehicles; and varying the timing of the drift periods accordingly, wherein increased proximity causes an increase in the length of the drift periods.

In one embodiment the method further comprises measuring a direction of motion of the (or each) vehicle; and varying the timing of the drift periods accordingly. For instance motion away from a transmitter of the signal bursts may cause a delay in a start and/or finish time of the drift periods.

The method may further comprise measuring a speed of the (or each) vehicle; and varying the lengths of the drift periods accordingly. For instance an increase in speed may cause the length of the drift periods to increase.

In one embodiment the average duration of the thrust pulses is less than the average duration of the quiet periods for the (or each) vehicle—for instance less than 50% of the average duration of the quiet periods for the (or each) vehicle. In another embodiment the average duration of the thrust pulses is greater than the average duration of the quiet periods for the (or each) vehicle.

The propulsion system may generate a small amount of thrust during the drift periods, but more preferably the (or each) propulsion system generates substantially zero thrust during the quiet periods.

Typically the series of signal bursts are transmitted by a transmitter with a transmit clock which is used to determine the timings of the series of signal bursts. Preferably the method further comprises synchronizing a receive clock on the (or each) vehicle with the transmit clock; and using the receive clock to determine the timings of the drift periods.

Each data set may consist of a single item of data, or a plurality of items of data. In a preferred embodiment each data set contains the location coordinates of the transmitter of the data. The data may be encoded in a number of ways, but most preferably it is encoded by pulse position modulation. Thus in a preferred embodiment the data is used to determine the position of the (or each) vehicle by the following process:

a) determining the positions of three or more transmitters;
b) transmitting from each transmitter at least four pulses (the four pulses together constituting a single "signal burst" as mentioned in the first aspect of the invention) wherein a time difference between each pulse and a previous one of the pulses is proportional to a respective co-ordinate of the position of the transmitter;
c) receiving the pulses at the underwater vehicle;
d) decoding the pulses received at the underwater vehicle by measuring the delays between them, thereby determining the co-ordinates of the transmitters;
e) determining the range of each transmitter relative to the underwater vehicle; and
f) determining the position of the underwater vehicle in accordance with the co-ordinates determined in step d) and the ranges determined in step e), for instance by multi-lateration.

BRIEF DESCRIPTION OF THE DRAWINGS

Embodiments of the invention will now be described with reference to the accompanying drawings, in which:

FIG. 5 shows three simultaneous pulse trains in separate frequency bands;
FIG. 6 shows a single pulse train where the pulses are in different frequency bands;
FIG. 12a is block diagram of the main functional components of the vehicle;

DETAILED DESCRIPTION OF EMBODIMENT(S)

Figure 1:
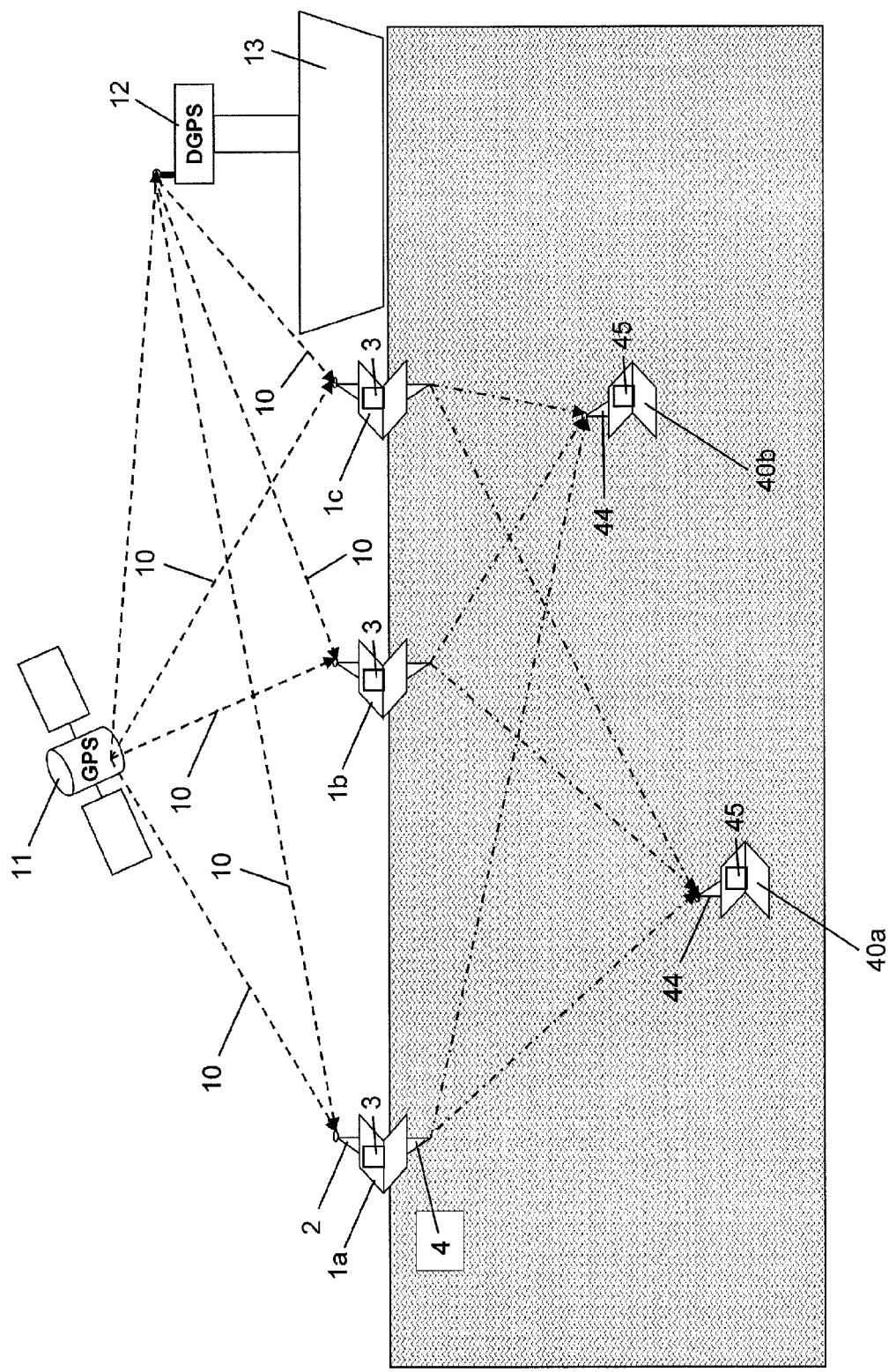
FIG. 1 shows an underwater communication system.

FIG. 1 shows an underwater communication system. Three transmitter buoys 1*a-c* are deployed on the surface of the water. Each buoy has a Global Positioning System (GPS) antenna 2, a processor 3 and an acoustic antenna 4.

The GPS antenna 2 receives GPS data signals 10 from a GPS satellite 11 and from a Differential GPS (DGPS) reference station 12 on a surface vessel 13. The processor process the GPS data signals 10 to determine the position of the buoy 1 in a known manner.

Figure 2:
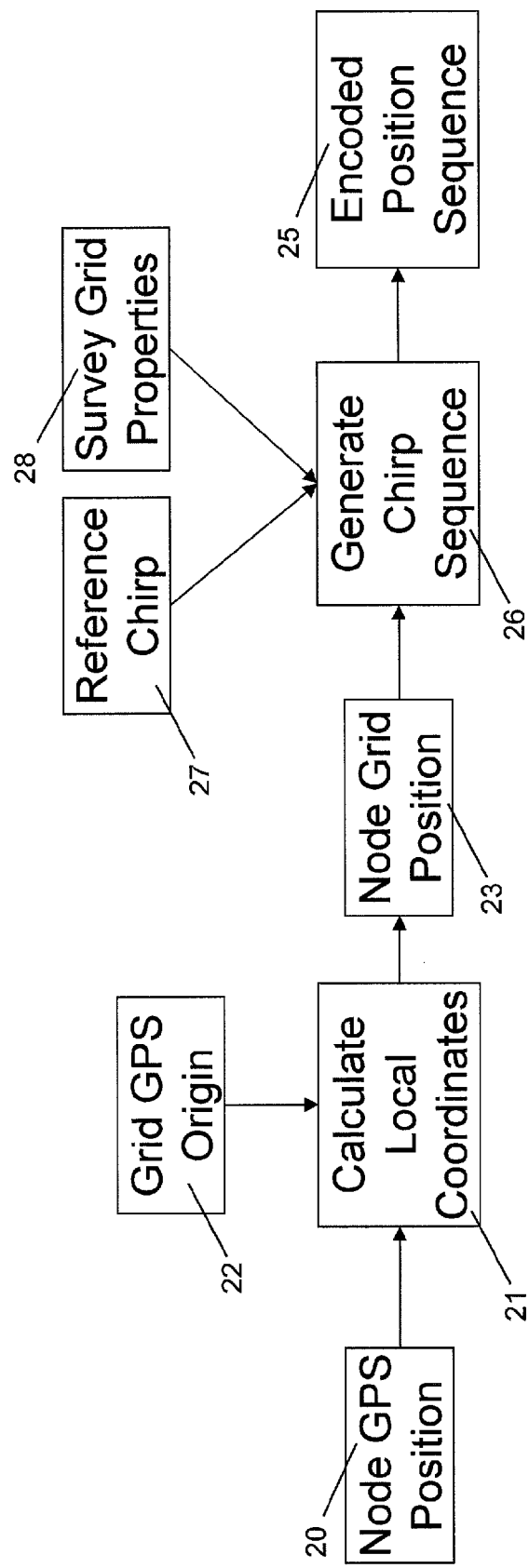
FIG. 2 shows a method of encoding a position sequence.
Figure 3:
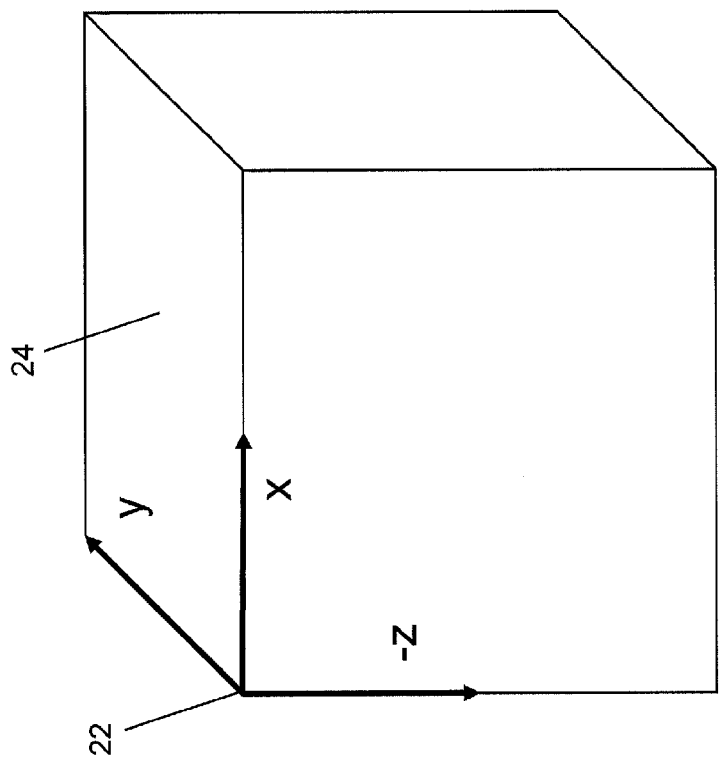
FIG. 3 shows a survey space.

FIG. 2 is a schematic diagram illustrating the method steps performed by the processors 3. The position of the buoy 1*a-c* is first determined in GPS coordinates (latitude, longitude and altitude) and stored as position data 20. This data 20 is then transformed at step 21 into a local coordinate system having an origin 22 (again, defined in terms of GPS coordinates) to give a grid position 23. This process is illustrated in FIG. 3 which shows an origin 22, and a cube 24 with orthogonal X, Y and Z axes meeting at the origin. Any position within the cube can be defined by three grid coordinates x, y, z relative to the origin 22.

Figure 4:
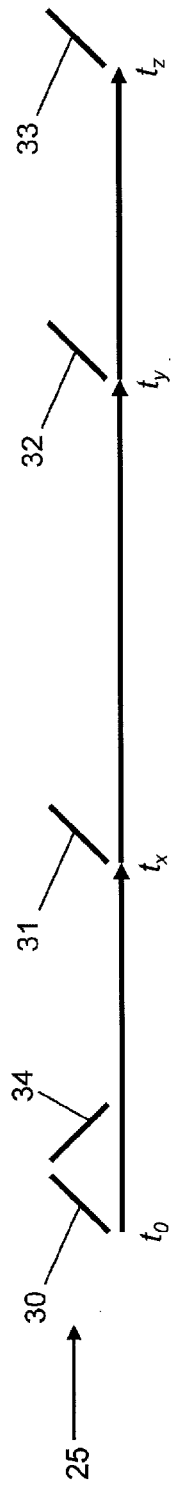
FIG. 4 shows a pulse train with the X axis being the time dimension and the Y axis being the frequency dimension.

The processor 3 is programmed to cause the acoustic transmitter 4 to transmit a chirp pulse position modulated acoustic pulse train 25 which encodes the xyz position of the buoy 1 as shown in FIG. 4.

This pulse train 25 is encoded from the grid position data 23 at step 26 in accordance with reference chirp data 27 and survey grid property data 28. The reference chirp data 27 defines for each a buoy a start frequency F1, a finish frequency F2, and a monotonic function which defines how the chirp frequency changes from F1 to F2 with respect to time (for instance the frequency might change at a constant rate between F1 and F2). The survey grid property data 28 defines the size of the cube 24 in meters (for instance 4096 m by 4096 m by 4096 m), the resolution required (for instance 0.25 m) and the maximum time between adjacent pulses in the pulse sequence (for instance 0.1 s).

The pulse train 25 shown in FIG. 4 comprises four low-to-high-frequency chirps 30-33 and a single high-to-low-frequency chirp 34. The low-to-high-frequency chirps 30-33 have a frequency which increases at a constant rate between a first low frequency F1 at the beginning of the pulse and a second high frequency F2 at the end of the pulse. The low-to-high-frequency chirps 30-33 start at times $t_0$, $t_x$, $t_y$, and $t_z$, respectively. The high-to-low-frequency chirp 34 has a frequency which decreases at a constant rate between a first high frequency at the beginning of the pulse and a low high frequency at the end of the pulse. The chirps 30,34 are used to signal the start of the pulse sequence.

The chirps in the pulse train of FIG. 4 have a frequency which changes at a constant rate. In an alternative pulse train (not shown) the chirps may instead have a period which changes at a constant rate.

The time difference ($\Delta t$) between each acoustic pulse and a previous one of the acoustic pulses is encoded at step 26 to be directly proportional to a respective co-ordinate (x,y,z) of the position of the buoy 1*a-c* in accordance with the equation:

$$\Delta t = \text{co-ordinate}(x,y,z) \times (k)$$

where k is a co-efficient of proportionality which in this case is 4096/0.1 m/s. In other words:

$$t_0 - t_x = X \text{ co-ordinate in meters} \times (0.1/4096)$$

$$t_x - t_y = Y \text{ co-ordinate in meters} \times (0.1/4096)$$

$$t_y - t_z = Z \text{ co-ordinate in meters} \times (0.1/4096)$$

The chirps from the buoys 1*a-c* are frequency-division-multiplexed as shown in FIG. 5. In this example the first buoy 1*a* transmits from F1*a* to F2*a*, the second buoy 1*b* transmits from F1*b* to F2*b*, and the third buoy 1*c* transmits from F1*c* to F2*c*. The chirps occupy non-adjacent and non-overlapping frequency bands so that F1*a*<F2*a*<F1*b*<F2*b*<F1*c*<F2*c*. The three pulse trains are then de-multiplexed at the underwater vehicles based on their frequency by a process of cross-correlation as described below. By way of example the frequency F1*a* may be of the order of 10 kHz and the frequency F2*c* might be of the order of 15 kHz.

Optionally each chirp from each buoy may also occupy a different frequency band as shown in FIG. 6. In this example the chirps from the buoy 1*a* occupy four non-adjacent and non-overlapping frequency bands, where F1*a*0<F2*a*0<F1*ax*<F2*ax*<F1*ay*<F2*ay*<F1*az*<F2*az*. The chirps from the other two vehicles are also similarly distributed within their respective frequency band. The individual chirps are then de-multiplexed at the underwater vehicles based on their frequency by a process of cross-correlation. This process also induces pulse compression at the receiver, which improves the resolution in time of the pulse arrival at the receiver.

In another example the pulse trains and/or individual chirps may be code-division-multiplexed (for instance by being mixed between up chirps and down chirps, or coded in some other way, perhaps by frequency hopping encoding) then de-multiplexed at the underwater vehicles based on their code.

Figure 7:
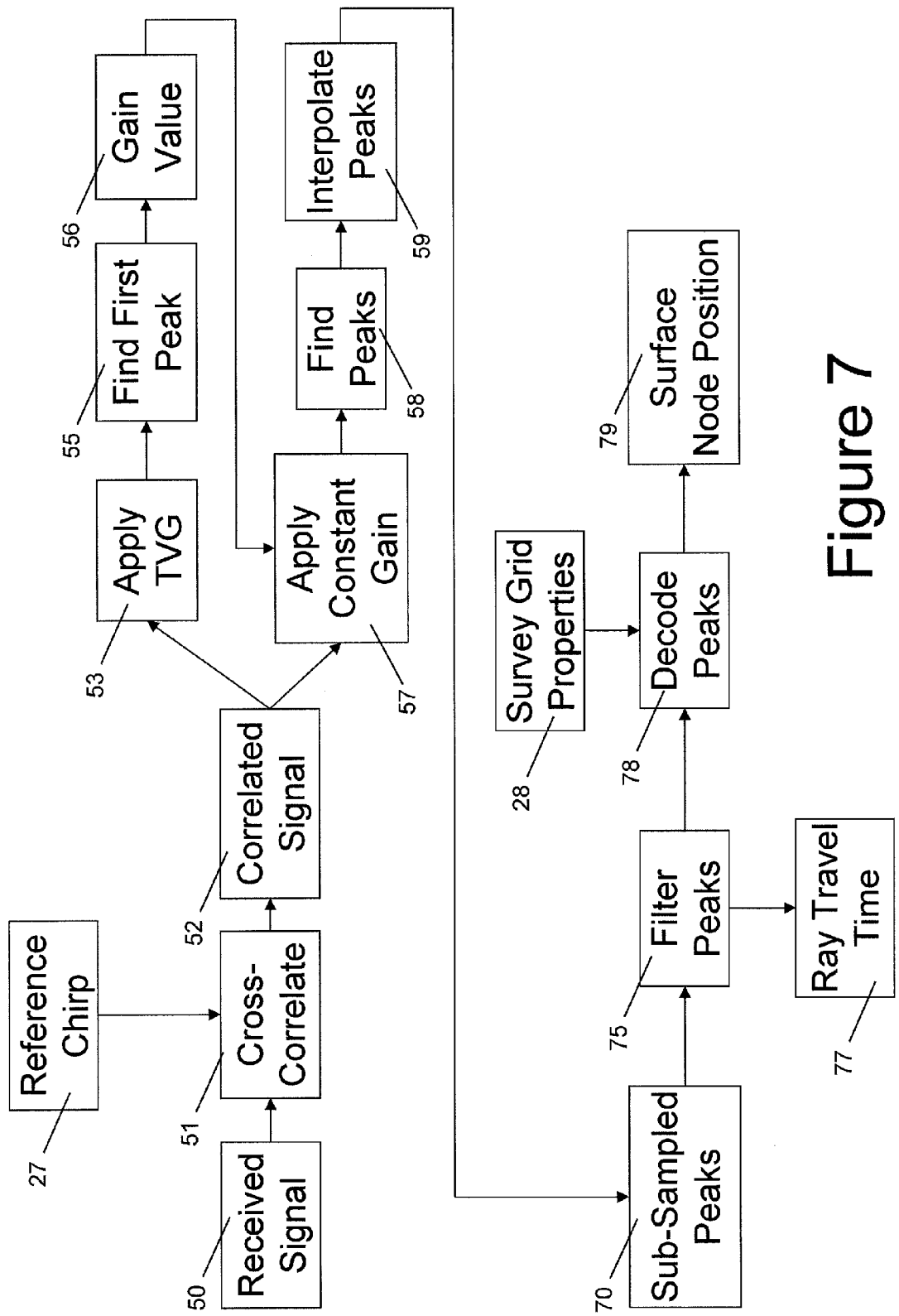
FIG. 7 shows a method of decoding the received signal to determine the buoy position.

The underwater vehicles 40*a,b* each have an acoustic antenna 44 for receiving the acoustic pulses 30-34, and a processor 45. The processor 45 measures the delays between the pulses 30-33, thereby determining the X, Y and Z co-ordinates of the buoys 1*a-c*. The process for doing this is shown in FIG. 7.

Figure 8:
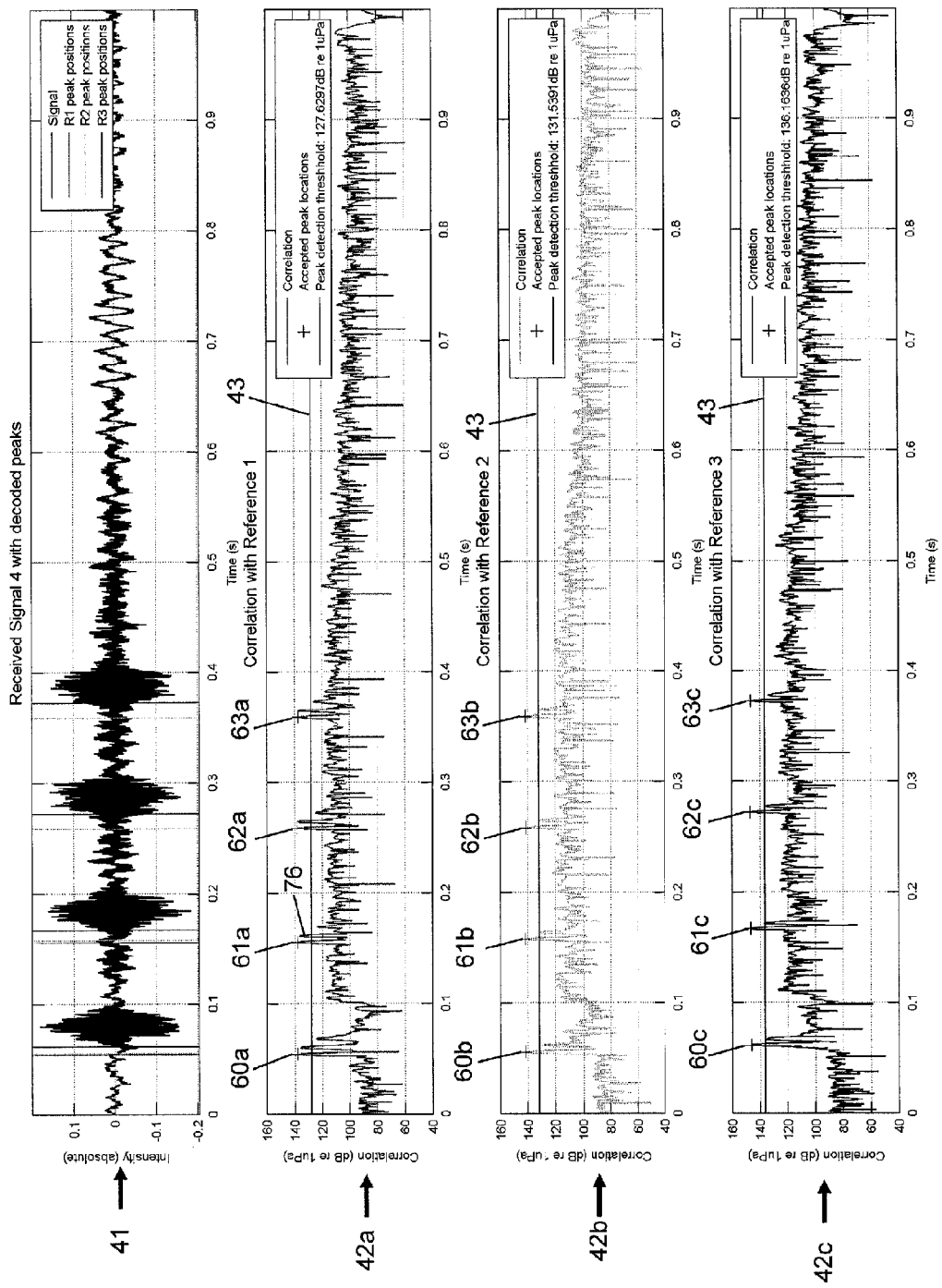
FIG. 8 shows the received signal and cross-correlated data derived from the received signal.

First the received acoustic signal data is received and stored at step 50. FIG. 8 shows the received signal data at 41 by way of example. Next this data is cross-correlated in step 51 with the reference chirp data 27 to generate cross-correlated signal data 52. The vehicles 40 and the buoys 1 have synchronised clocks so the vehicles know the time $t_0$ at which the buoys have transmitted the first pulse. At step 53 a time-variable gain is applied to the cross-correlated signal, the gain increasing constantly with respect to time after $t_0$. Once the first peak in the cross-correlated signal 52 has been detected at step 55 then the gain value 56 at that time is recorded and applied for subsequent parts of the cross-correlated signal data 52 at step 57. This time varying gain accounts for the fact that if the vehicle is far away from a buoy then the received signal will be weaker and delayed by a greater time than the received signal for a vehicle which is closer to the buoy 1. The graphs 42*a-c* in FIG. 8 show the cross-correlated data for the three buoys 1*a-c* after gain has been applied as described above.

In step 58 the four peaks in each of the signals 42*a-c* are determined by detecting when the signals have exceeded a predetermined threshold. Peaks 60*a-c*, 61*a-c*, 62*a-c* and 63*a-c* are shown in FIG. 8 for the signals 42*a-c* respectively along with the threshold 43. It can be seen that these all have a roughly equal amplitude.

Figure 9:
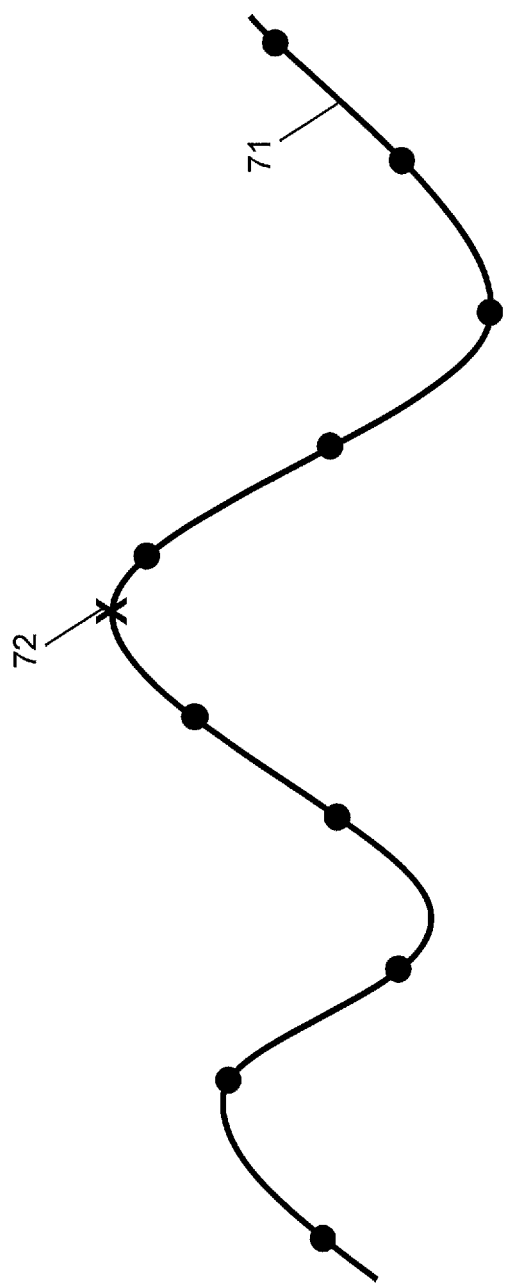
FIG. 9 shows an analog signal with sampling points.

Next the cross-correlated data is interpolated at step 59 to generate sub-sampled peak data 70. The process of interpolation is illustrated in FIG. 9. Signal 71 shows the analogue input data generated by a transducer and amplifier on the vehicle. An analog to digital converter samples the signal 71 at various points shown by dots in FIG. 9. The amplitude at the peak 72 is calculated by interpolating between the sampled data values on each side of the peak.

Returning to FIG. 7, the sub-sampled peak data 70 is then filtered and processed at step 75 by rejecting any echoes (for instance echo 76 shown in FIG. 8), and rejecting any peaks where the amplitude of the peak is too high relative to a previous peak, relative to some average peak value, or relative to a predetermined expected range of amplitude values.

Another output of step 75 is a ray travel time 77 which gives the time of receipt of the first peak 60*a-c* relative to the known time $t_0$ at which the first pulse was transmitted by the buoys 1*a-c*. Another output of step 75 is a set of filtered sub-sampled peak data which is decoded at step 78 in accordance with the grid property data 28 to determine the position 79 of the buoy. In other words the filtered sub-sampled peak data is decoded as follows:

$$t_0 - t_x \times (4096/0.1) = X \text{ co-ordinate in meters}$$

$$t_x - t_y \times (4096/0.1) = Y \text{ co-ordinate in meters}$$

$$t_y - t_z \times (4096/0.1) = Z \text{ co-ordinate in meters}$$

Figure 10:
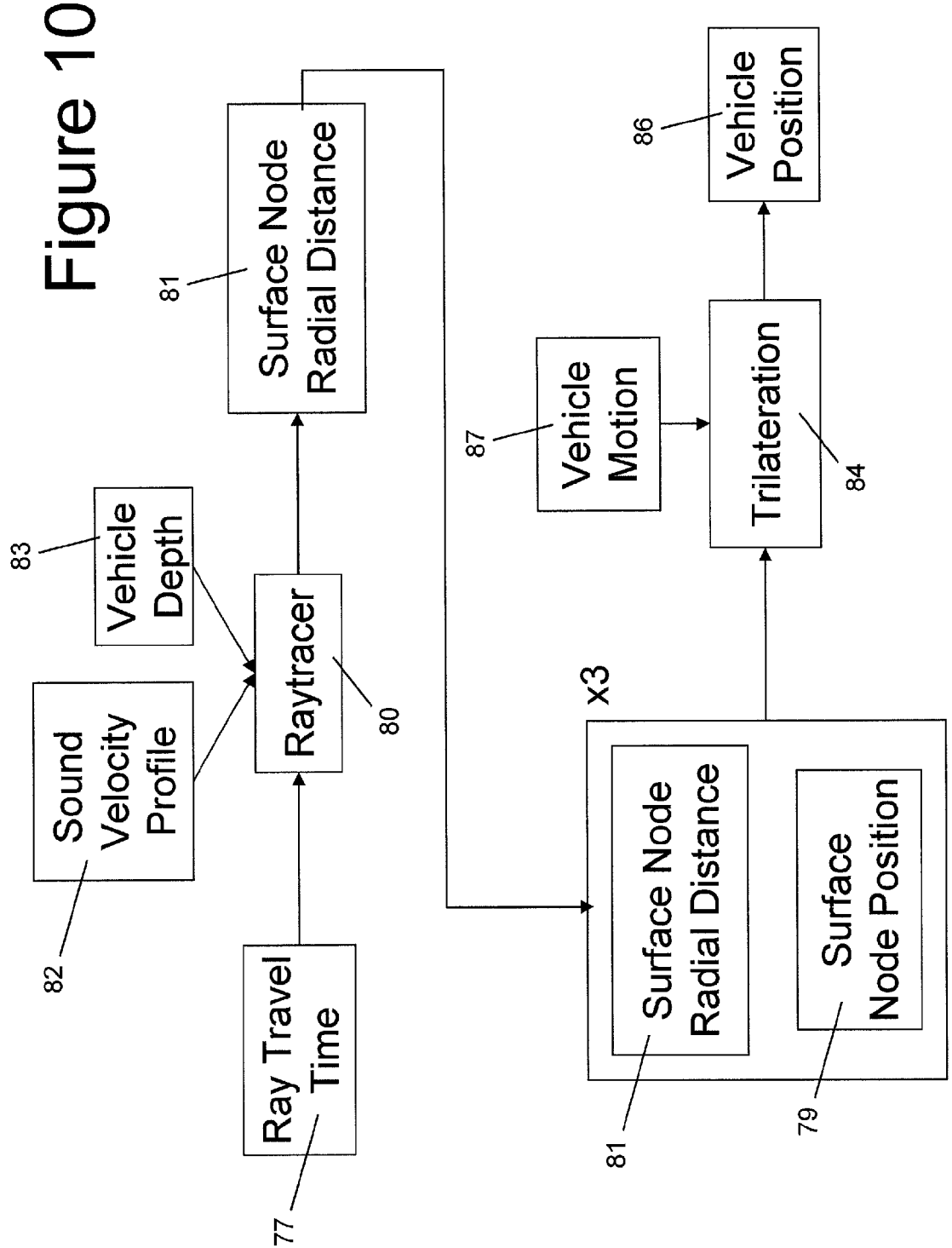
FIG. 10 shows a method of determining the position of the underwater vehicle from the ranges and positions of the buoys.

FIG. 10 shows how the data 77, 79 is used by each vehicle 40*a-c* to determine its position. In step 80 a raytracer algorithm determines a radial distance 81 in accordance with the ray travel time 77, a stored set of sound velocity profile data 82, and the vehicle depth 83 measured by a pressure sensor onboard the vehicle. This ray tracer algorithm 80 accounts for the fact that the sound waves will not travel in a straight line from the buoy to the vehicle due to the increase in pressure with depth.

The vehicle now has the radial distance (or range) 81 and position 79 of each one of the three buoys 1*a-c*. This data is than analyzed by a trilateration algorithm at step 84 to calculate the position 86 of the vehicle. An input to the trilateration algorithm is the velocity 87 of the vehicle (as measured by onboard algorithms which may interpret the data from devices such as accelerometers and/or as calculated based on previous position measurements). This takes into account the fact that the vehicle may have moved between receiving the first pulse and the last pulse, so the output 86 of the algorithm 84 is the position of the vehicle at the time that the last pulse was received.

Any errors in the measurements of the delays Δt between the pulses only translate into small errors in the X, Y or Z co-ordinates because of the proportionality between the delays Δt and the co-ordinate values X, Y and Z. Therefore if there is a gradual decrease of signal-to-noise ratio then the accuracy of the position estimate also degrades gradually.

The use of pulse position modulation also provides a low computation overhead in decoding and encoding.

The use of chirp pulses gives high processing gain due to their high bandwidth (processing gain being proportional to bandwidth multiplied by the period of the signal).

Although only two vehicles 40*a,b* are shown in FIG. 1 for purposes of simplicity, a large fleet of such vehicles may be provided (potentially 100 or more) for instance for the purpose of accurately distributing a grid of seismic sensors over a wide area of the seabed. The use of pulse position modulation for encoding the acoustic transmissions ensures that there is a relatively large time difference Δt between the pulses from a given buoy 1. This relatively large time difference provides time for any delayed versions of the original pulse, due to multipath effects, to be sufficiently attenuated so as not to cause interference with the current pulse. Thus the likelihood of inter-symbol interference is reduced compared with other encoding methods, such as frequency shift keying, which transmit each symbol consecutively. With such encoding methods it is not possible to increase the time between symbol transmissions without dramatically reducing the data rate of the communication channel.

Figure 11:
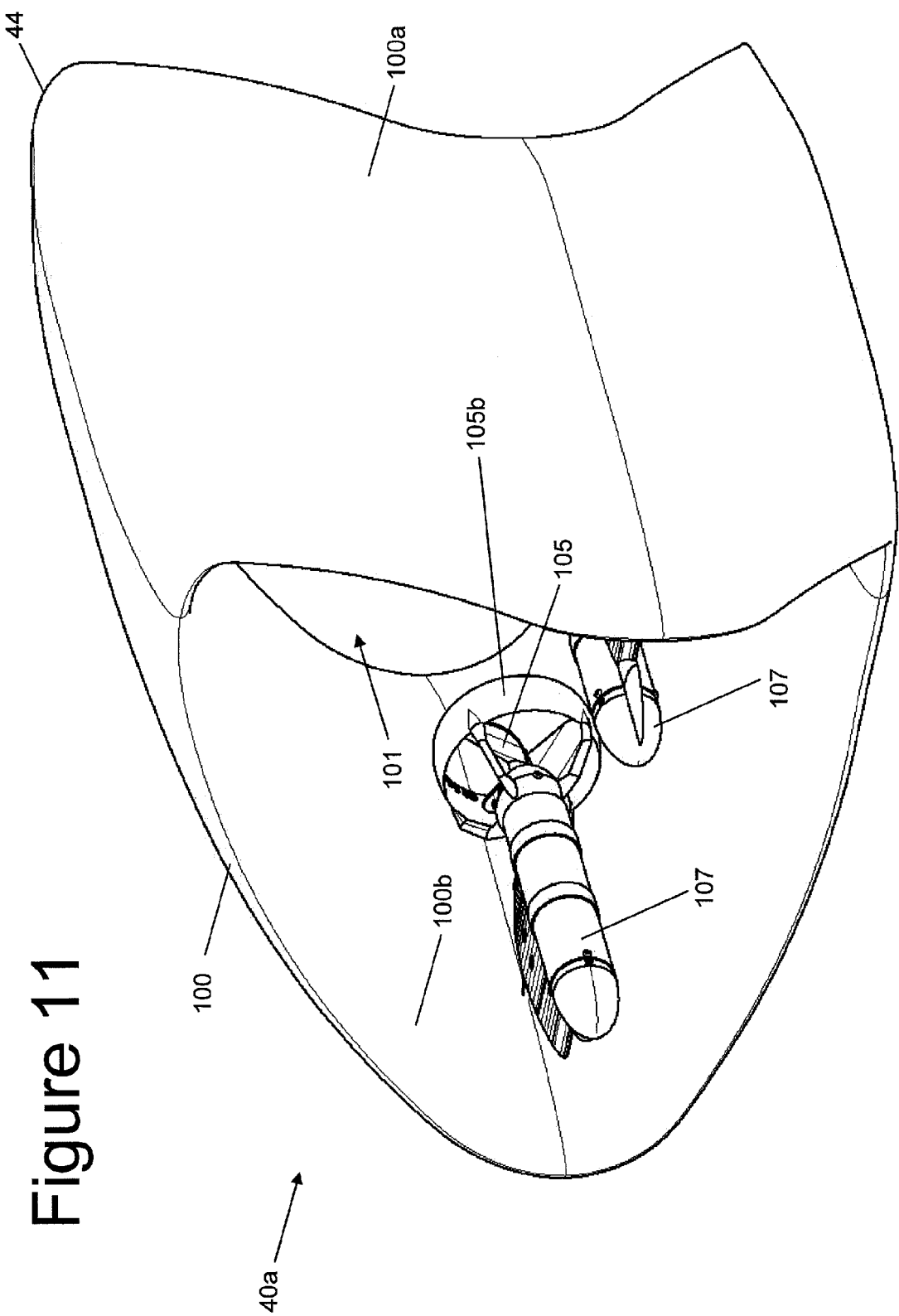
FIG. 11 shows one of the vehicles in detail.

One of the vehicles 40*a* is shown in detail in FIG. 11. The vehicle has an annular hull 100 with a duct 101; and a propulsion system for propelling the vehicle through the water comprising a pair of rotary propellers 105 housed within the duct on opposite sides of the central axis of the duct. The hull has an outer skin 100*a* defining the outer profile of the hull and an inner skin 100*b* defining the duct 101. The inner and outer skins meet at a leading edge and a trailing edge of the hull 100. The skins 100*a* and 100*b* are circular when viewed in cross-section at right angles to the central axis of the duct. Each propeller 105 is mounted on a thrust motor 107 and within a shroud 105*b*. Each motor 107 is pivotally mounted so the propeller/motor unit can be independently rotated up and down (relative to the orientation of FIG. 11) to vary its angle of thrust relative to the central axis of the duct. The shroud and propeller of one of the propulsion units is not visible in FIG. 1, but it is identical to the shroud 105*b* and propeller 105 which are shown.

Figure 12C:
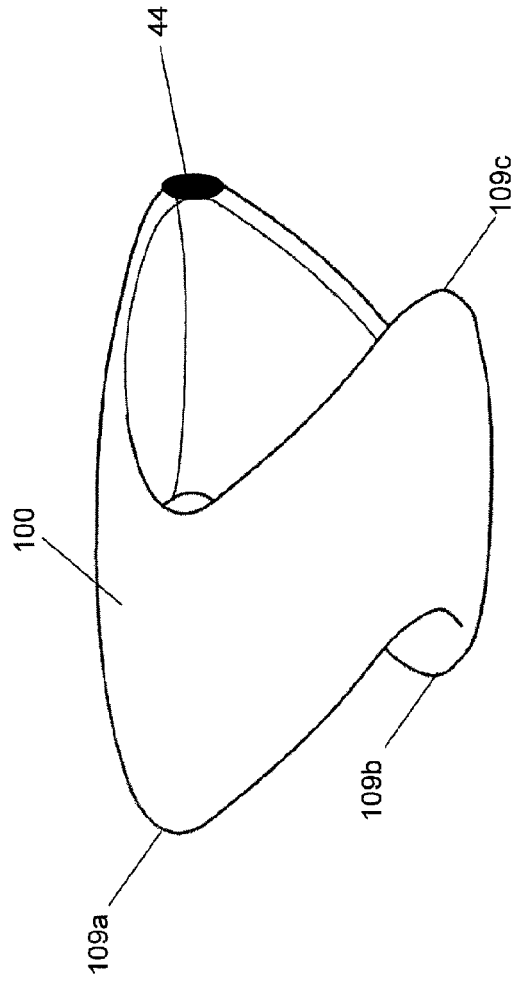
FIG. 12*c* is a further view of the vehicle with the propulsion units omitted.
Figure 12D:
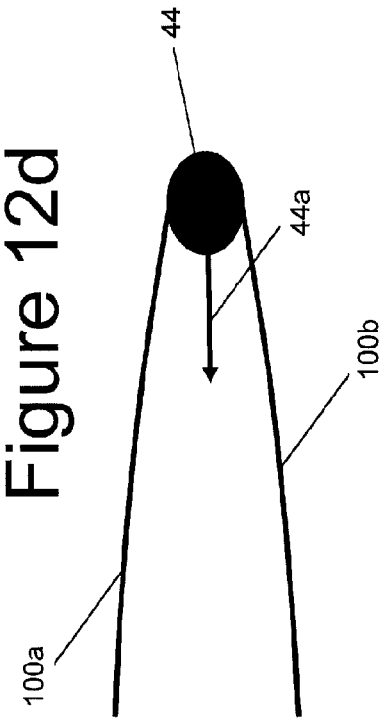
FIG. 12*d* is a sectional view through the upper tail of the vehicle showing the antenna.
Figure 12B:
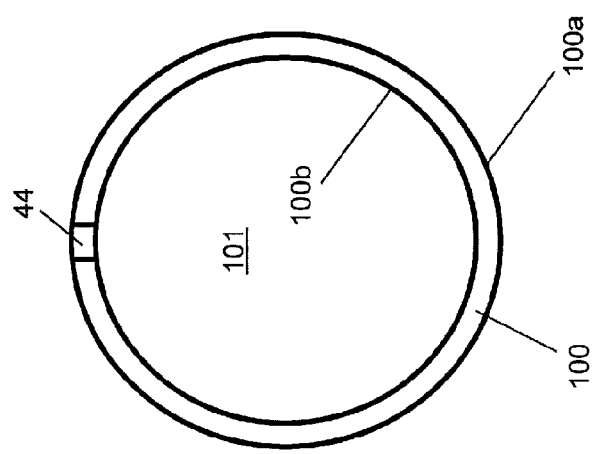
FIG. 12*b* is a rear view of the vehicle with the propulsion units omitted.

FIG. 12*a* is a block diagram showing the main functional elements of the vehicle. An acoustic antenna 44 (also shown in FIG. 1) receives the acoustic signal pulses which are conditioned and analog-to-digital converted by a unit 106*a* and input to the processor 45 (also shown in FIG. 1) along with clock signals from a time reference unit 106*d* and acceleration signals from accelerometers 106*e*. Although the antenna 44 is shown in FIG. 1 protruding from the hull of the vehicle for purposes of illustration, preferably the antenna 44 is conformal with the hull 100 as shown in FIGS. 12*b*-12*d*. The hull 100 has a port and starboard nose 109*a*, 109*b* at one end, a lower tail 109*c* at the other end and an upper tail at which the antenna 44 is mounted. FIG. 12*b* is a rear view of the vehicle with the propulsion units omitted, and FIG. 12*d* is a section through the antenna 4. As shown in FIGS. 12*b* and 12*d* the antenna 44 is flush with the skins 100*a*,100*b*, and as shown in FIG. 12*d* the rear edge of the antenna 44 is curved so as to form a curved trailing edge conforming with the hydrofoil section provided by the skins 100*a*,100*b*. The skins 100*a*,100*b* do not cover the antenna 44 so acoustic signals are not impeded. A signal wire 44*a* connects the antenna 44 with the electronics elements 106*a*, 45,106*d*,106*e* which are housed entirely within the hull 100 between the inner and outer skins 100*a*,100*b*.

The processor 45 operates as described above to determine the position of the vehicle. The processor 45 decodes the signal bursts to obtain the series of data sets encoded within them and determine the vehicle position. The processor 45 also controls the angle of thrust of the propellers via actuator motors 108. The processor 45 also controls the operation of the thrust motors 107 and is programmed to implement a sprint and drift control process as described below with reference to FIGS. 13-15.

Figure 13:
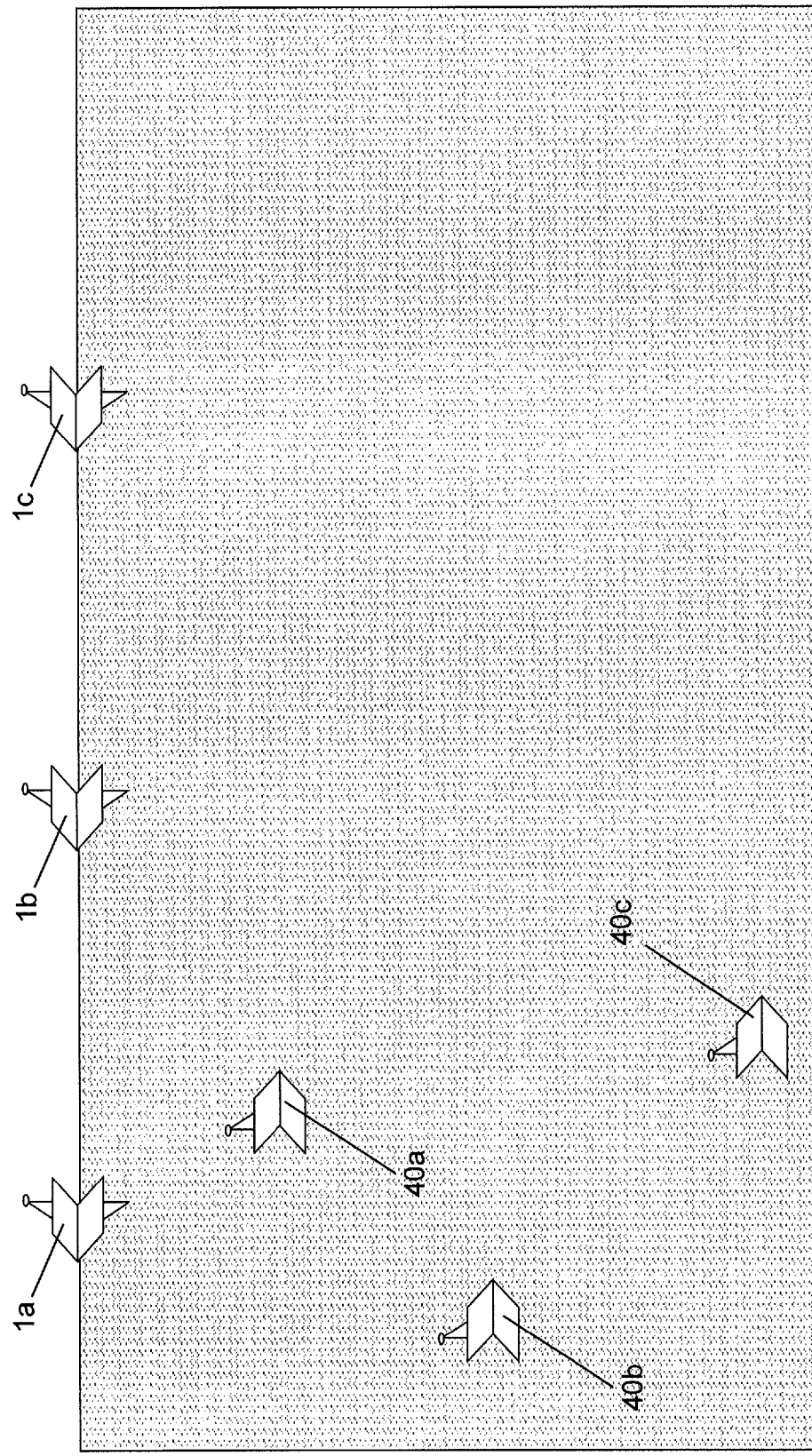
FIG. 13 shows three buoys and three vehicles.
Figure 14:
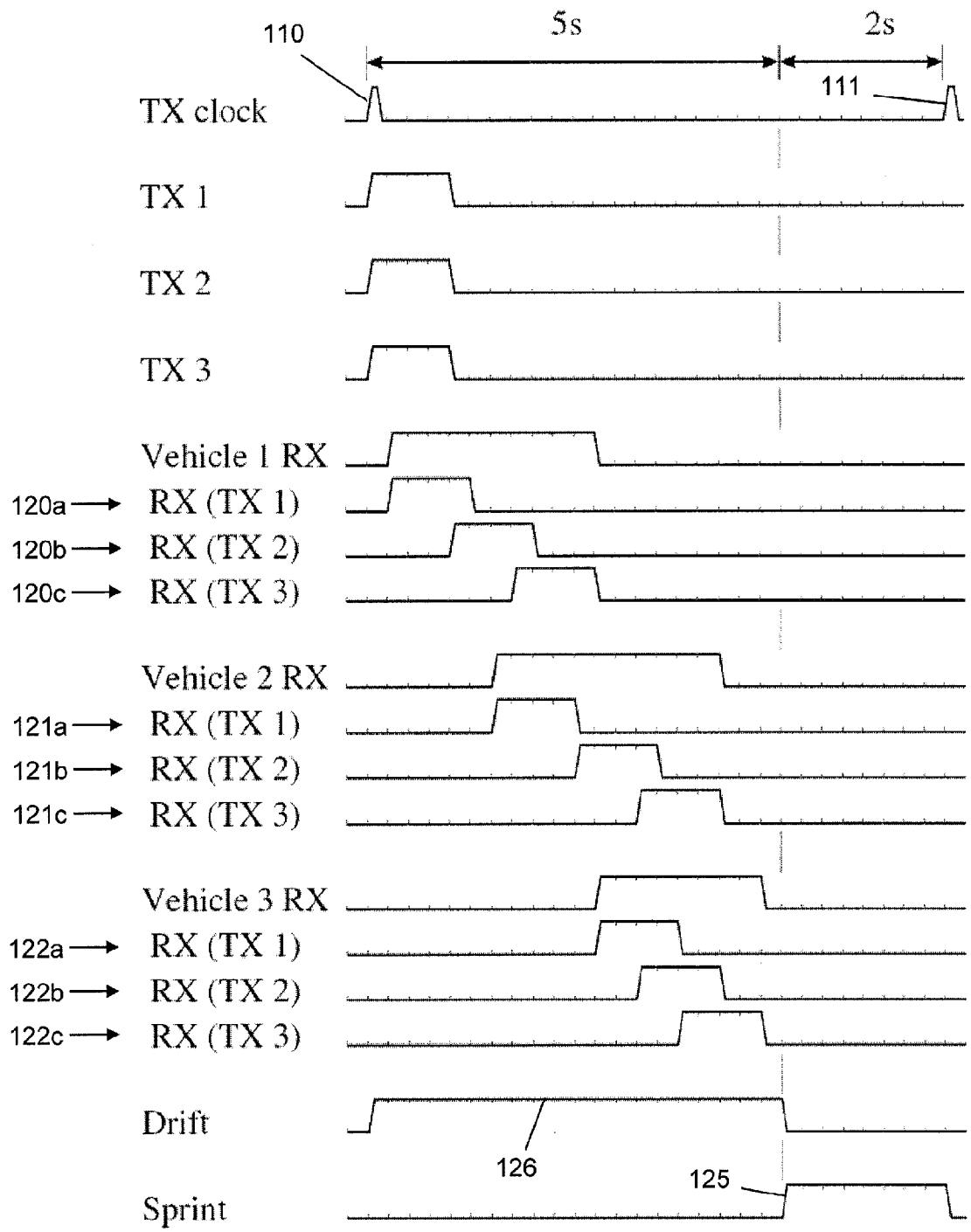
FIG. 14 is a timing diagram for a synchronous sprint and drift method.

FIG. 13 shows three vehicles 40*a-c* and FIG. 14 is a timing diagram showing a synchronous sprint and drift method of operating the vehicles 40*a-c*. As described above, the buoys 1*a-c* encode a series of data sets (each data set containing the X, Y and Z coordinates of the buoy at a given point in time), each data set being coded as a respective pulse train 25 as described above. These pulse trains 25 are then broadcast to the underwater vehicles, each pulse train 25 being initiated by a transmit clock pulse 110 shown in FIG. 14 generated by a transmit clock on the buoy. The cycle repeats regularly every 7 seconds (a second transmit clock pulse 111 being shown in FIG. 14). If the position of the buoy changes between cycles then the pulse train for the next cycle will also change—otherwise the pulse trains will not change. FIG. 14 shows three pulse trains TX1-3 broadcast by buoys 1*a-c* respectively.

The receive clocks 106*d* on the vehicles 40*a-c* are synchronized with the transmit clocks on the buoys 1*a-c*, so they also generate receive clock pulses (not shown) at exactly the same time as the TX clock pulses 110, 111 etc.

Vehicle 40*a* receives the pulse trains TX1-3 from the three buoys at different times, and these are shown as three receive pulse trains 120*a*-120*c*. The time between the beginning of the first pulse train and the end of the last pulse train is illustrated by a receive pulse envelope Vehicle 1 RX.

Vehicle 40*b* also receives the pulse trains at different times, and these are shown as three receive pulse trains 121*a*-121*c*. The time between the beginning of the first pulse train and the end of the last pulse train is illustrated by a receive pulse envelope Vehicle 2 RX.

Vehicle 40*c* also receives the pulse trains at different times, and these are shown as three receive pulse trains 122*a-c*. The time between the beginning of the first pulse train and the end of the last pulse train is illustrated by a receive pulse envelope Vehicle 3 RX.

The thrust motors 107 of the vehicles are operated synchronously by their respective processors 45 in a series of thrust pulses 125 separated by drift periods 126. The propellers 105 rotate at a relatively high rate during the thrust pulses 125 and at a relatively low (or zero) rate during the drift periods 126. Each drift period 126 has a fixed length of 5 seconds (starting at or shortly after the clock pulse 110) and each thrust pulse 125 has a fixed length of 2 seconds. The cycle then repeats regularly and indefinitely—a clock pulse 111 for the next cycle being shown in FIG. 14.

As can be seen in FIG. 14, the drift periods 126 of the vehicles 40*a-c* are timed relative to the receive clock pulse on the vehicle to ensure that that each pulse train arrives at the underwater vehicle during a drift period 126 and not during a thrust pulse 125—with no part of any of the pulse trains arriving during a thrust pulse 125.

The annular shape of the vehicle's hull ensures that water flows through the duct 101 and generates lift during the thrust pulses and during the drift periods. The high lift to drag ratio of the vehicle assists in maintenance of vehicle speed over ground during the drift periods.

In the example of FIG. 14 the propulsion systems of the vehicles are operated substantially synchronously such that the drift periods of all of the vehicles start and finish at substantially the same time. The duration of the thrust pulses 125 is much less than the duration of the quiet periods 126 for each vehicle (in this example the duration of the thrust pulses 125 is 40% of the duration of the drift periods 126).

Figure 15:
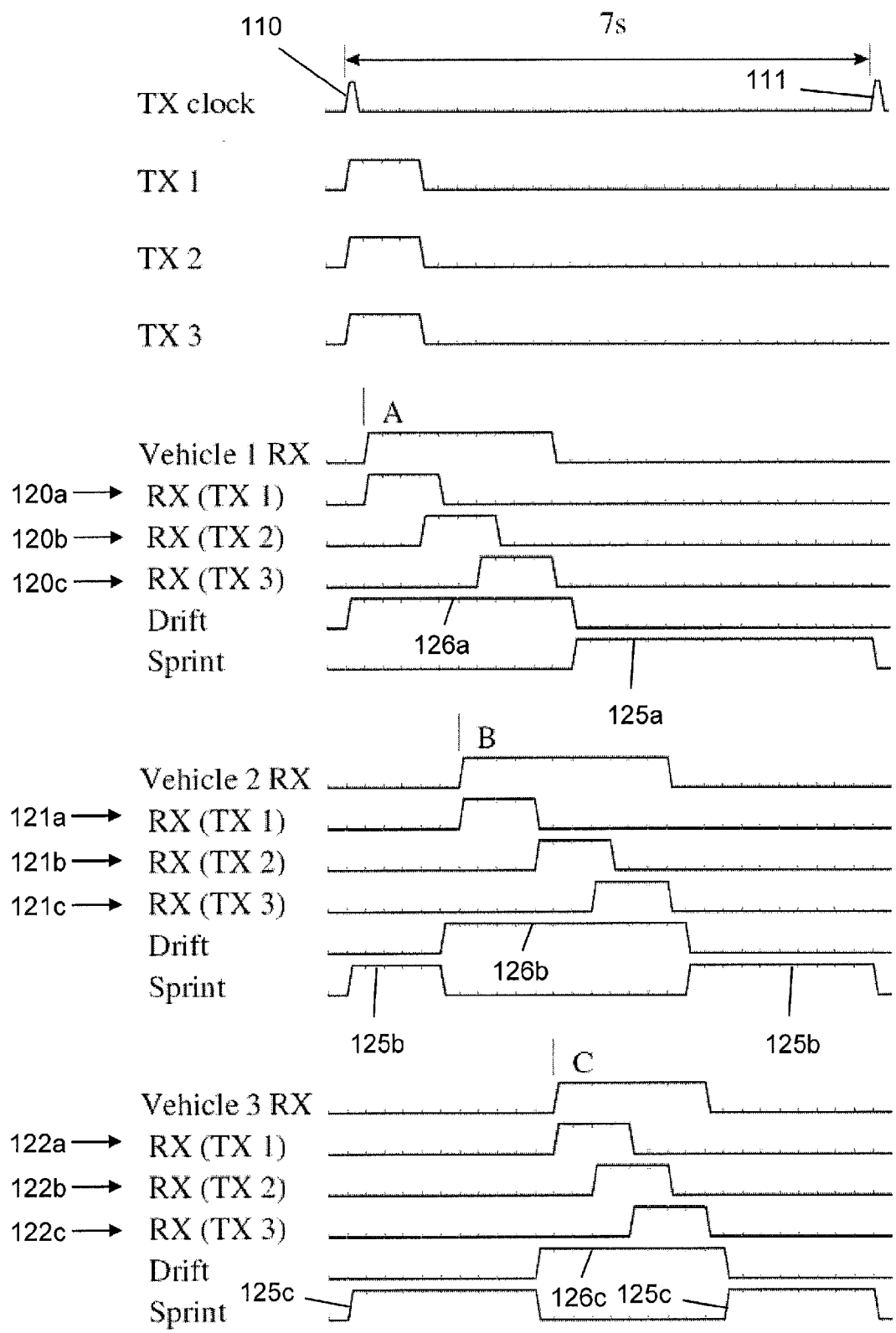
FIG. 15 is a timing diagram for an synchronous sprint and drift method.

In an alternative example shown in FIG. 15 the timings of the drift periods of the vehicles are varied independently and asynchronously.

Vehicle 40*a* is the closest to the buoys 1*a-c*, so it receives the acoustic signals first. Its drift period 126*a* is timed to start just before the beginning of the first pulse train 120*a* and finish just after the end of the last pulse train 120*c*.

The next closest vehicle is vehicle 40*b*, and its drift period 126*b* is timed to start just before the beginning of the first pulse train 121*a* and finish just after the end of the last pulse train 121*c*.

The furthest vehicle is vehicle 40*c*, and its drift period 126*c* is timed to start just before the beginning of the first pulse train 122*a* and finish just after the end of the last pulse train 122*c*.

The advantage of the asynchronous method of FIG. 15 is that the length of the drift periods can be reduced compared to FIG. 14, so in this example the lengths of the drift periods 126*a-c* are slightly shorter than the lengths of the sprint periods 125*a-c* (summed over a 7 second cycle).

The timings of the drift periods 126*a-c* can be varied in a number of ways.

Firstly, the timing can be varied by estimating a time of arrival of the pulse train from each buoy and varying the timing of the drift periods accordingly—later estimated time of arrival causing a delay in a start and/or finish time of the drift periods 126*a-c*. The time of arrival may be estimated for instance by measuring and recording the time of arrival of the pulse train in the previous cycle from each buoy (relative to $t_0$ for that cycle). Optionally the estimate can be adjusted to account for any expected change caused by movement of the vehicle since the last cycle—for instance if the vehicle is moving towards the buoy then the drift period is advanced in the next cycle, and vice versa if the vehicle is moving away from the buoy. Optionally the estimate can be adjusted in accordance with both the speed and the direction of the motion of the vehicle—for instance if the vehicle is moving quickly towards the buoy then the drift period will be advanced more in the next cycle than if it is moving slowly towards the buoy.

The timing can also be varied by measuring a proximity of each vehicle to other vehicles, and varying the timing of the drift periods accordingly—increased proximity causing an increase in the length of the drift periods. This ensures that a vehicle does not generate noise which interferes with neighboring vehicles which are close by.

Although the invention has been described above with reference to one or more preferred embodiments, it will be appreciated that various changes or modifications may be made without departing from the scope of the invention as defined in the appended claims.

The invention claimed is:

1. A method of communicating with an underwater vehicle, the underwater vehicle comprising a propulsion system for propelling the vehicle through the water, the method comprising:

a. encoding a series of data sets to produce a series of encoded data signals;
   b. transmitting the encoded data signals to the underwater vehicle in a series of signal bursts;
   c. operating the propulsion system in a series of thrust pulses separated by drift periods such that the propulsion system operates at a relatively high rate during the thrust pulses and at a relatively low, or zero, rate during the drift periods;

d. timing the drift periods of the propulsion system such that each signal burst arrives at the underwater vehicle during a drift period and not during a thrust pulse; and e. decoding the signal bursts at the underwater vehicle to obtain the series of data sets.

2. The method of claim 1 wherein the vehicle comprises an annular hull with a duct, and wherein water flows through the duct and generates lift during the thrust pulses and during the drift periods.

3. The method of claim 1 wherein the encoded data signals are transmitted to the underwater vehicle in a series of signal bursts by a first transmitter at a first location, and the method further comprises:

a. encoding a second series of data sets to produce a second series of encoded data signals;

b. transmitting the second series of encoded data signals to the underwater vehicle in a second series of signal bursts by a second transmitter at a second location which is remote from the first location;

c. timing the drift periods of the propulsion system such that each signal burst in the second series arrives at the underwater vehicle during a drift period and not during a thrust pulse; and d. decoding the second series of signal bursts at the underwater vehicle to obtain the second series of data sets.

4. A method of operating an underwater vehicle, the underwater vehicle comprising an annular hull with a duct; and a propulsion system for propelling the vehicle through the water, the method comprising:

a. operating the propulsion system in a series of thrust pulses separated by drift periods such that the propulsion system operates at a relatively high rate during the thrust pulses and at a relatively low, or zero, rate during the drift periods, wherein water flows through the duct and generates lift during the thrust pulses and during the drift periods;

b. receiving a series of signal bursts at the vehicle;

c. timing the drift periods of the propulsion system such that each signal burst arrives at the underwater vehicle during a drift period and not during a thrust pulse; and d. decoding the signal bursts received at the underwater vehicle to obtain a series of data sets encoded within them.

5. The method of claim 1, further including a second underwater vehicle and wherein the encoded data signals are broadcast simultaneously to each of the underwater vehicles in the series of signal bursts.

6. A method of operating a plurality of underwater vehicles to receive a series of data sets which have been broadcast to them, each underwater vehicle comprising a propulsion system for propelling the vehicle through the water, the method comprising for each vehicle:

a. operating the propulsion system in a series of thrust pulses separated by drift periods such that the propulsion system operates at a relatively high rate during the thrust pulses and at a relatively low, or zero, rate during the drift periods;

b. receiving a series of signal bursts at the vehicle;

c. timing the drift periods of the propulsion system such that each signal burst arrives at the underwater vehicle during a drift period and not during a thrust pulse; and d. decoding the signal bursts received at the underwater vehicle to obtain the series of data sets encoded within them.

7. The method of claim 6 wherein the propulsion system of the vehicles are operated substantially synchronously such that the drift periods of all of the vehicles start and finish at substantially the same time.

8. The method of claim 6 wherein the propulsion systems of the vehicles are operated asynchronously such that the drift periods of at least a first one of the vehicles start and/or finish at different times to at least a second one of the vehicles.

9. The method of claim 1 further comprising measuring a parameter for the vehicle; and varying the timing of the drift periods accordingly.

10. The method of claim 1 further comprising estimating a time of arrival of the signal bursts at the vehicle; and varying the timing of the drift periods accordingly, wherein a delay in the estimated time of arrival causes a delay in a start and/or finish time of the drift periods.

11. The method of claim 1 further comprising measuring a proximity of the vehicle to other vehicles; and varying the timing of the drift periods accordingly, wherein increased proximity causes an increase in the length of the drift periods.

12. The method of claim 1 further comprising measuring a speed or direction of motion of the vehicle; and varying the timing of the drift periods accordingly.

13. The method of claim 1 wherein the average duration of the thrust pulses is less than the average duration of the drift periods for the vehicle.

14. The method of claim 1 wherein the propulsion system generates substantially zero thrust during the drift periods.

15. The method of claim 1 wherein the series of signal bursts are received by the underwater vehicle from a transmitter with a transmit clock which was used to determine the timings of the series of signal bursts, and wherein the method further comprises synchronizing a receive clock on the vehicle with the transmit clock; and using the receive clock to determine the timings of the drift periods.

16. The method of claim 4, wherein the underwater vehicle includes an annular hull with a duct; a propulsion system for propelling the vehicle through the water; and a control and processing system programmed to operate the vehicle.

17. The vehicle of claim 16 wherein the annular hull comprises an outer skin defining an outer profile of the hull and an inner skin defining the duct; and wherein the control and processing system is housed at least partially within the hull between the inner and outer skins.

18. The method of claim 6, wherein each of the plurality of underwater vehicles includes a propulsion system for propelling the vehicle through the water, and a control and processing system programmed to operate the vehicle to perform steps a. to d.

* * * * *